US008700756B2

(12) United States Patent
Chidlovskii

(10) Patent No.: US 8,700,756 B2
(45) Date of Patent: Apr. 15, 2014

(54) SYSTEMS, METHODS AND DEVICES FOR EXTRACTING AND VISUALIZING USER-CENTRIC COMMUNITIES FROM EMAILS

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 318 days.

(21) Appl. No.: 13/099,502

(22) Filed: May 3, 2011

(65) Prior Publication Data

US 2012/0284381 A1 Nov. 8, 2012

(51) Int. Cl.
*H04L 12/58* (2006.01)

(52) U.S. Cl.
USPC .......................... 709/223; 709/224; 709/206

(58) Field of Classification Search
USPC .................... 709/204–206, 223; 715/319
See application file for complete search history.

(56) References Cited

U.S. PATENT DOCUMENTS

| | | | | |
|---|---|---|---|---|
| 6,437,804 | B1* | 8/2002 | Ibe et al. | 715/736 |
| 7,610,367 | B2* | 10/2009 | Canright et al. | 709/223 |
| 7,894,372 | B2* | 2/2011 | Chu et al. | 370/255 |
| 8,090,665 | B2* | 1/2012 | Yang et al. | 705/319 |
| 8,386,574 | B2* | 2/2013 | Chidlovskii et al. | 709/206 |
| 8,396,855 | B2* | 3/2013 | Aggarwal et al. | 707/709 |
| 8,560,681 | B2* | 10/2013 | Ramirez et al. | 709/224 |
| 2003/0160695 | A1* | 8/2003 | Hisano | 340/539.13 |
| 2005/0044268 | A1* | 2/2005 | Johnston-Watt et al. | 709/238 |
| 2005/0138070 | A1* | 6/2005 | Huberman et al. | 707/104.1 |
| 2006/0080422 | A1* | 4/2006 | Huberman et al. | 709/223 |
| 2008/0086551 | A1* | 4/2008 | Moy | 709/223 |
| 2010/0145771 | A1* | 6/2010 | Fligler et al. | 705/10 |
| 2010/0217869 | A1* | 8/2010 | Esteban et al. | 709/226 |
| 2010/0268719 | A1* | 10/2010 | Cormode et al. | 707/756 |
| 2011/0087968 | A1* | 4/2011 | Lakshmanan et al. | 715/751 |
| 2011/0103682 | A1* | 5/2011 | Chidlovskii et al. | 382/159 |
| 2011/0191693 | A1* | 8/2011 | Baggett et al. | 715/752 |
| 2012/0215865 | A1* | 8/2012 | Sacks et al. | 709/206 |
| 2012/0259915 | A1* | 10/2012 | Bhatt et al. | 709/204 |
| 2012/0290672 | A1* | 11/2012 | Robinson et al. | 709/206 |
| 2012/0331064 | A1* | 12/2012 | Deeter et al. | 709/206 |
| 2013/0046842 | A1* | 2/2013 | Muntz et al. | 709/206 |
| 2013/0135314 | A1* | 5/2013 | Haggerty et al. | 345/440 |

OTHER PUBLICATIONS

Chapanond et al., "Graph Theoretic and Spectral Analysis of Enron Email Data," Computational & Mathematical Organization Theory, 11, pp. 265-281, 2005.*
"Discovering Social Network Graphs in Email Flows," printed from orgnet.com on May 12, 2013.*

(Continued)

*Primary Examiner* — Alina N. Boutah
(74) *Attorney, Agent, or Firm* — MH2 Technology Law Group LLP

(57) ABSTRACT

Embodiments generally relate to systems and methods for extracting and visualizing user-centric communities from emails. A set of email data comprising a set of users can be identified and a communication graph comprising a center node can be generated from the email data. The center node can be removed from the communication graph and a set of communities can be determined from the remaining data. The center node can be reconnected to a center of each of the set of communities to form a community graph. The links connecting the center node with the center of each of the set of communities can have a weight calculated according to a formula. The community graph can be visualized and provided to an administrator.

16 Claims, 5 Drawing Sheets

(56) References Cited

OTHER PUBLICATIONS

Chapanond et al., "Graph Theoric and Spectral Analysis of Enron Email Data," pp. 15-22, printed on May 12, 2013.*

Girvan, M. and M. E. J. Newman. "Community structure in social and biological networks." PNAS (Jun. 11, 2002) vol. 99, No. 12: 7821-7826.

Porter, Mason A., Jukka-Pekka Onnela and Peter J. Mucha. "Communities in Networks." Not. Amer. Math. Soc. (Sep. 9, 2009) 56: 1-26.

Newman, M. E. "Fast algorithm for detecting community structure in networks." Phys. Rev. E 69 (Sep. 22, 2009): 1-5.

Fruchterman, Thomas M. J. and Edward M. Reingold. "Graph Drawing by Force-directed Placement" Software—Practice and Experience (Nov. 1991) vol. 21(11): 1129-1164.

Hogan, Bernie, Juan Antonio Carrasco and Barry Wellman. "Visualizing Personal Networks: Working with Participant-Aided Sociograrns." Filed Methods (2007): 1-25.

Ann, Yang Yeah James P. Bagrow and Sune Lehmann. "Link communities reveal mustiscale complexity in networks," Nature (Jun. 20, 2010) 466: 761-764.

Visualize Social Network, printed on Nov. 7, 2011. <http:\\scaledinnovation.com/analytics/communities/comlinks.html>.

Heer, Jeffrey and D. Boyd. "Vizster: Visualizing Online Social Networks." (2005) <http://hci.stanford.edu/jheer/projects/vizster>.

Opsahl, Tore, Filie Agneessens and John Skvoretz, "Node Centrality in Weighted Networks: Generalizing Degree and Shortest Paths," Social Networks (Apr. 20, 2010): 1-25.

* cited by examiner

SYSTEMS, METHODS AND DEVICES FOR EXTRACTING AND VISUALIZING USER-CENTRIC COMMUNITIES FROM EMAILS

FIELD OF THE INVENTION

This invention relates generally to community detection and visualization, and more particularly, to systems, methods and devices for generating personal communication graphs from emails of a user mailbox.

BACKGROUND OF THE INVENTION

Complex networks can comprise topological features that seldom occur in simple networks but often occur in real-world networks such as computer networks, biological networks, and social networks. A complex network is said to have a community structure if the network divides into groups of nodes, wherein the groups of nodes are more densely connected internally than with the rest of the network, suggesting that the data comprises one or more natural divisions. For example, a social network can have community groups based on occupation, location, interests, education, and the like. Further, characteristics such as the small-world property, clustering, and community structure can be found in complex network data.

Finding community structures in a network can prove difficult because, for example, the number of community structures within the network may be unknown and the community networks can be of unequal size and/or density. Some existing methods can be used to discover community structures within a network, such as, for example, hierarchical clustering, the Girvan-Newman algorithm, modularity maximization, and others. While these methods can prove successful in analyzing conventional networks, these methods behave poorly when analyzing personal electronic mail (email) data.

Therefore, it may be desirable to have systems and methods for community detection in complex networks. In particular it may be desirable to have systems and methods for detecting and visualizing community traits within personal email data.

SUMMARY

An embodiment generally relates to method of processing data. The method comprises identifying, from email data, a set of users associated with the email data and generating a communication graph between the set of users, wherein the communication graph comprises a center node. Further, the method comprises generating an obscured graph by removing the center node from the communication graph, determining a set of communities of the obscured graph, and generating a community graph by connecting the center node with a center of each of the set of communities.

Another embodiment pertains generally to a system for processing data. The system comprises an interface to a storage device configured to store email data and a processor that communicates with the storage device via the interface. The processor is configured to identify, from the email data, a set of users associated with the email data, generate a communication graph between the set of users, wherein the communication graph comprises a center node, generate an obscured graph by removing the center node from the communication graph, determine a set of communities of the obscured graph, and generate a community graph by connecting the center node with a center of each of the set of communities.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of analysis systems, and that any such variations do not depart from the true spirit and scope of the present invention. Moreover, in the following detailed description, references are made to the accompanying figures, which illustrate specific embodiments. Electrical, mechanical, logical and structural changes can be made to the embodiments without departing from the spirit and scope of the present invention. The following detailed description is, therefore, not to be taken in a limiting sense and the scope of the present invention is defined by the appended claims and their equivalents.

Embodiments generally relate to systems and methods for community detection and visualization. In particular, the embodiments relate to platforms and techniques for parsing email data of a user and detecting communities common to a set of users associated with the parsed data. In embodiments, the term "email data" as used herein can refer to any type of communication data exchanged between users over a network. The email data can further comprise source and destination data or metadata that can be found in fields such as, for example, "TO:", "FROM:", "CC:", "BCC:", and others. The email data can be aggregated or gathered from online or offline email accounts, one or more user inboxes or mailboxes, mail directories, or other mail collections.

In embodiments, the term "user" as used herein can refer to a person, entity, or party who receives or sends an email. In an individual email, communication links between users can be represented in the metadata fields "TO:", "FROM:", "CC:", "BCC:", and others. The email data, taken together, can bring information on communities around a certain activity or interest. In embodiments, a communication graph $G=(V, E)$ can be extracted from a collection of email data, wherein V is the set of communicating users and E is an edge set. In some embodiments, because some users can have multiple email addresses, a user disambiguation step can be conducted to unify all emails of the same user.

Figure 1:
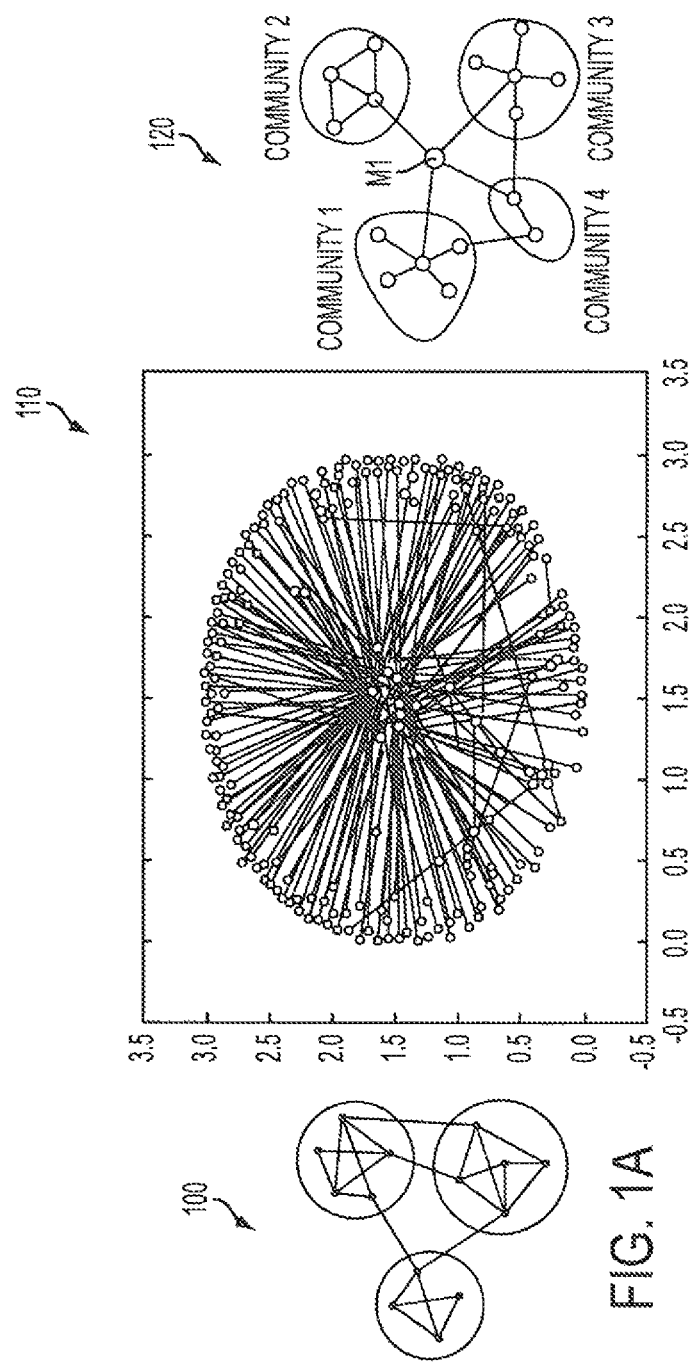
FIG. 1 illustrates exemplary visualizations of network data, according to various embodiments.

FIG. 1 illustrates exemplary visualizations of network data. It should be appreciated that the visualizations of FIG. 1 are merely exemplary and can be generated using any method or system from any set of data. FIG. 1 comprises a simple network visualization 100, an email data visualization 110, and a desired email data visualization 120. In embodiments, data in the simple network visualization 100 can be from any type of data except email data, personal communication data, or the like. Further, data in the email data visualization 120 can be from any type of email data. Still further, the desired email data visualization 130 can represent a desired visualization of any type of email data.

As shown in FIG. 1, the simple network visualization 100 can comprise multiple groups of nodes, with dense connections within the groups and sparser connections between groups. Hence, the simple network visualization 100 can have what is referred to as a "community structure," wherein the network can have certain natural divisions within it. In embodiments, the groups of nodes can form from multiple characteristics, such as small-world properties, heavy-tailed degree distributions, clustering, community structures, and others.

The email data visualization 110 comprises data that was compiled from an email inbox of an individual using conventional techniques and algorithms. As shown in FIG. 1, the email data visualization 110 can comprise a densely-populated center node with numerous exterior data points. More particularly, the email data visualization 110 lacks the groups of nodes that are evident in the simple network visualization 100. Therefore, characteristics associated with group nodes in email data cannot be readily extracted or visualized from the email data visualization 110. In embodiments, the desired email data visualization 130 represents a preferred visualization for data extracted from an individual's email. More particularly, the desired email data visualization 130 comprises groups of nodes similar to the ones of the simple network visualization 100, wherein the groups of nodes can represent common characteristics that can be extracted from email data.

Figure 2:
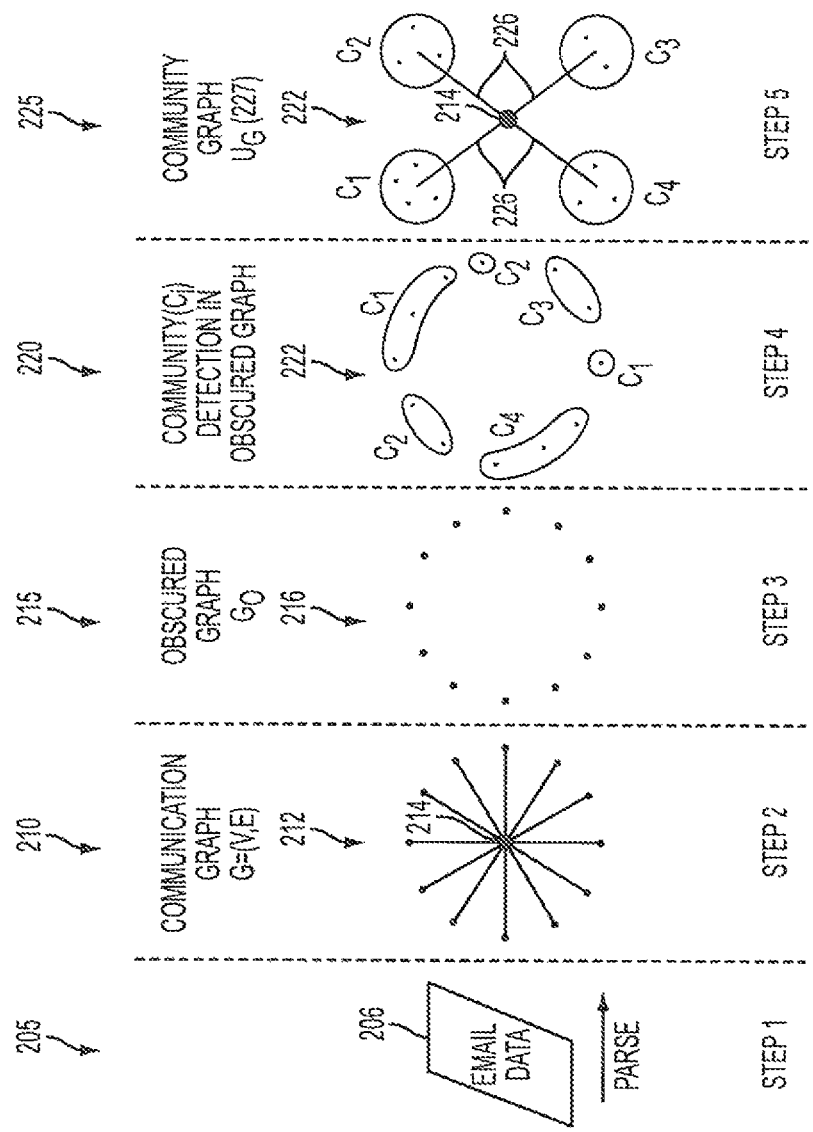
FIG. 2 illustrates an exemplary embodiment for systems and methods for community detection and visualization, according to various embodiments.

FIG. 2 illustrates an exemplary diagram that can be used in systems, methods, and devices for extracting and visualizing user-centric communities from emails. It should be appreciated that the structures and values as depicted in FIG. 2 are merely exemplary and can represented by any arrangement. Further, it should be appreciated that any processing, calculations, and the like as detailed with respect to the systems and methods described herein can be conducted by a graph generation application, logic, or any other hardware and/or software component capable of processing data.

As shown in FIG. 2, in STEP 1 (205), email data 206 of a user can be gathered and parsed. It should be appreciated that the email data 206 can be gathered from any email account of any user via any network. In embodiments, the email data 206 can be combined from multiple email addresses of the same user via, for example, a user disambiguation process. Further, the email data 206 can be parsed according to any convention or technique capable of parsing and/or analyzing the email data 206.

In embodiments, in STEP 2 (210), a communication graph 212 can be generated from the email data 206. More particularly, the communication graph 212 (G) can be represented by a formula G=(V, E), wherein V comprises a set of communicating users of the email data 206, and E is an edge set. In embodiments, a matrix W can be defined as a set of weights over the edge set E in the communication graph 212, and can be represented by a formula W={w(i,j)}. In embodiments, the set of communicating users V and the associated edge set E can represent communication links between the set of communicating users, and can be gathered from metadata fields in the email data 206 such as, for example, "TO:", "FROM:", "CC:", "BCC:", and the like. Specifically, the data of the communication graph 212 can represent certain activities, interests, age, education, hobbies, and the like, among the set of communication users V. The communication graph 212 can comprise a center node 214 that can be a subset of the set of communicating users V. More particularly, the center node 214 can comprise one or more of the set of communicating users V such as, for example, the user whose account(s) is associated with the email data 206.

In embodiments, in STEP 3 (215), an obscured graph $G_O$ 216 can be generated from the communication graph 212. In particular, the obscured graph $G_O$ 216 can be generated by removing the center node 214 and the corresponding edges between the center node 214 and the outer points of the communication graph 212. What can remain in the obscured graph $G_O$ 216 are the outer points of the communication graph 212. In embodiments, in STEP 4 (220), a set of communities $C_i$ 222 can be detected from the data points in the obscured graph 216. For example, as shown in FIG. 2, communities $C_1$, $C_2$, $C_3$, and $C_4$ can be detected from the data points in the obscured graph 216. It should be appreciated that the set of communities $C_i$ 222 can be detected according to any algorithm or technique such as, for example, hierarchical clustering, the Girvan-Newman algorithm, modularity maximization, and others. Further, it should be appreciated that the set of communities $C_i$ 222 can represent any commonality among the data of the obscured graph 216 such as, for example, interests, activities, age, education, hobbies, and other types of communities.

In embodiments, in STEP 5 (225), a community graph $U_G$ 227 can be generated from the set of communities $C_i$ 222 and the communication graph 212. In particular, the community graph $U_G$ 227 can comprise the set of communities $C_i$ 222 connected to the center node 214. As shown in FIG. 2, the data points of each of the set of communities $C_i$ 222 can be grouped together. In embodiments, the center node 214 can be a first centrality node of the community graph $U_G$ 227. Further, each of the set of communities $C_i$ 222 can comprise a center $c_i$ that can be identified as a second centrality node of the community graph $U_G$ 227.

As shown in FIG. 2, a set of links 226 can be connected from the center node 214 ("r") to the center $c_i$ of each of the set of communities $C_i$ 222. In embodiments, the weight $w(r, c_i)$ can be defined by the equation:

$$w(r, c_i) = \frac{1}{|c_i|} \sum_{n \in C_i} w(r, n) \quad (1)$$

As detailed in equation (1), for each core node in the center node r 214 and for each community in the set of communities $C_i$ 222, a graph is composed of the data points of each of the set of communities $C_i$ 222. It should be appreciated that the graph can be composed according to any algorithm or technique. After the graph is composed, the center $c_i$ of each of the set of communities $C_i$ 222 can be determined and denoted. Next, the appropriate link from the set of links 226 can be connected from the center node r 214 to the respective center $c_i$. In embodiments, the appropriate link from the set of links 226 can have a weight equal to that specified in equation (1), or other values. Further, in embodiments, the community graph $U_G$ 227 can be visualized using various algorithms and techniques such as, for exam pie, an energy-based layout.

In embodiments, the communication graph G 212 and the weight matrix W can be filtered according to various criteria. Specifically, the communication graph 212 and the weight matrix W can be filtered with field and keyword pairs, wherein the field entry can refer to the metadata entry from which the email data is gathered, and the keyword entry can be a word(s) to be searched. For example, the user can specify the keyword "baseball" from the email body field, whereby the emails having "baseball" in its body section will be retained for the communication graph 212. In further embodiments, the communication graph G 212 and the weight matrix W can be filtered with a time-span, timeframe, or the like. For example, a time-span entry can specify that only emails from 1 Jan. 1999 to 31 Jan. 1999 will be retained for the communication graph 212. It should be appreciated that other filtering criteria are envisioned such as, for example, whether the email has an attachment, a size of the email, and other metrics. In embodiments, a user, administrator, or other entity or logic can specify the field and keyword pairs, the time-span entry, or other filtering criteria. Further, the filtering criteria can be specified automatically by logic.

Figure 3A:
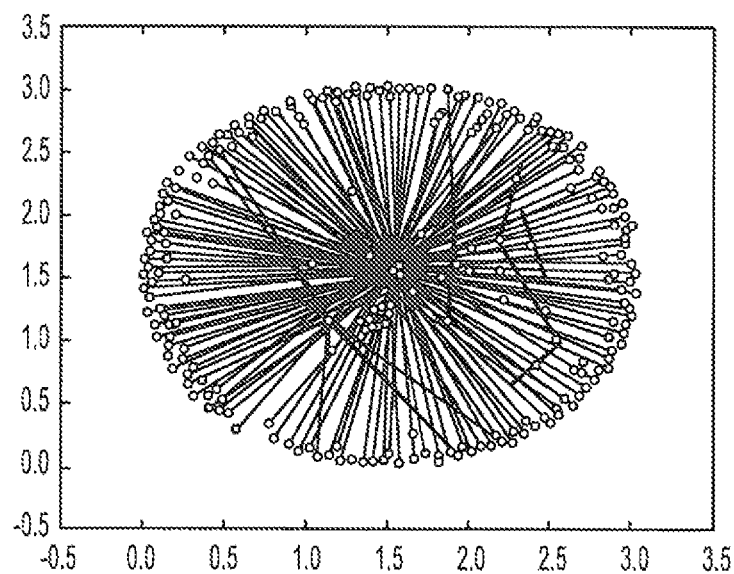
FIG. 3A illustrates an exemplary visualization of network data, according to various embodiments.
Figure 3B:
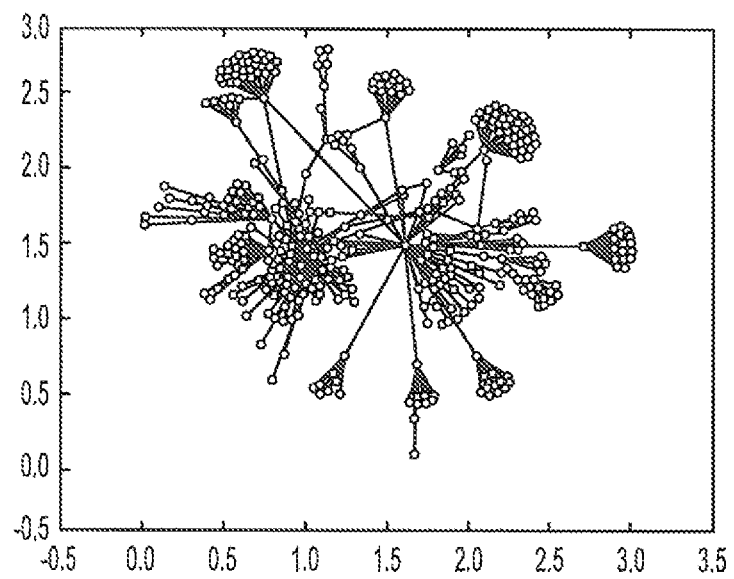
FIG. 3B illustrates an exemplary visualization of network data, according to various embodiments.

FIGS. 3A and 3B illustrate screen captures generated by systems and methods for email data extraction and visualization, as discussed herein. The screen captures illustrated in FIGS. 3A and 3B were generated from email data of a user over a two year time span. Referring to FIG. 3A, depicted is a communication graph of the email data. In embodiments, the communication graph of FIG. 3A can be generated similar to the communication graph 212 as discussed herein. Further, referring to FIG. 3B, depicted is a community graph of the same email data. In embodiments, the community graph of FIG. 3A can be generated similar to the community graph 227 as discussed herein.

As shown in the communication graph of FIG. 3A, the email data is not readily segmented into communities. Further, the email data of the communication graph has little to no decipherable characteristics that could suggest common interests or activities commonly present in social network data. However, when the communication graph is rearranged into the community graph of FIG. 3B, the communities that can represent common interests, activities, and the like are more apparent and decipherable. In embodiments, the communication graph of FIG. 3A can be converted into the community graph of FIG. 3B according to the systems and methods as described herein.

Figure 4:
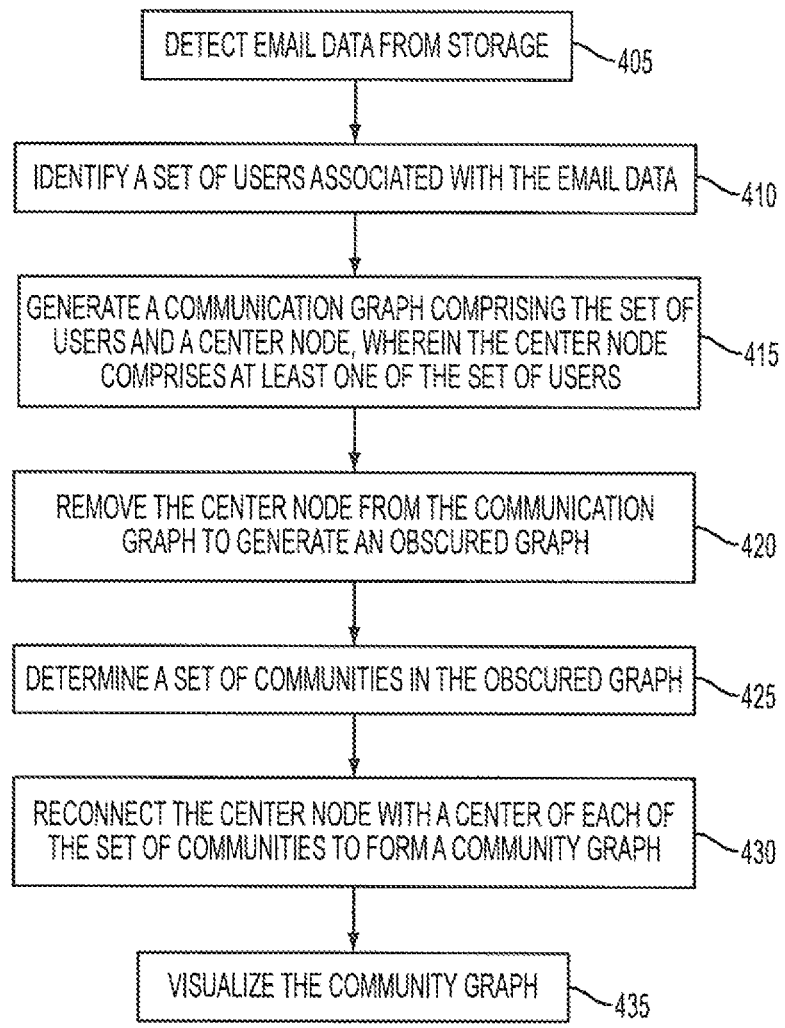
FIG. 4 illustrates an exemplary flow diagram implemented according to various embodiments.

FIG. 4 illustrates an exemplary flow diagram 400 that can be used in systems and methods for extracting and visualizing user-centric communities from emails. It should be readily apparent to those of ordinary skill in the art that the flow diagram 400 depicted in FIG. 4 represents, a generalized illustration and that other steps can be added or existing steps can be removed or modified.

As shown in FIG. 4, in 405, email data can be detected. In embodiments, the email data can be stored in any form of storage. In 410, a set of users associated with the email data can be identified. In embodiments, the set of users, can be identified from metadata associated with the email data such as, for example, the "TO:", "FROM:", "CC:", and "BCC:" fields. In 415, a communication graph comprising the set of users and a center node can be generated. In embodiments, the center node can comprise one or more of the set of users.

In 420, the center node can be removed from the communication graph to generate an obscured graph. In embodiments, the center node and a set of links connecting the center node with the outer data points can be removed from the communication graph. In 425, a set of communities can be determined from the obscured graph. In embodiments, the set of communities can be determined from the remaining data points of the obscured graph, and can be determined using any community detection algorithm or technique.

In 430, the center-node can be reinserted and connected to a center of each of the set of communities to form a community graph. In embodiments, the set of communities can be rearranged and a center of each of the set of communities can be determined. Further, the center node can be connected to the center of each of the set of communities via a link with a weight specified by the equation (1). In 435, the community graph can be visualized. In embodiments, the community graph can be visualized using, for example, an energy-based layout. Further, in embodiments, the visualization can be provided to a user, administrator, or other entity via, for example, a graphical user interface (GUI) or other component or medium.

Figure 5:
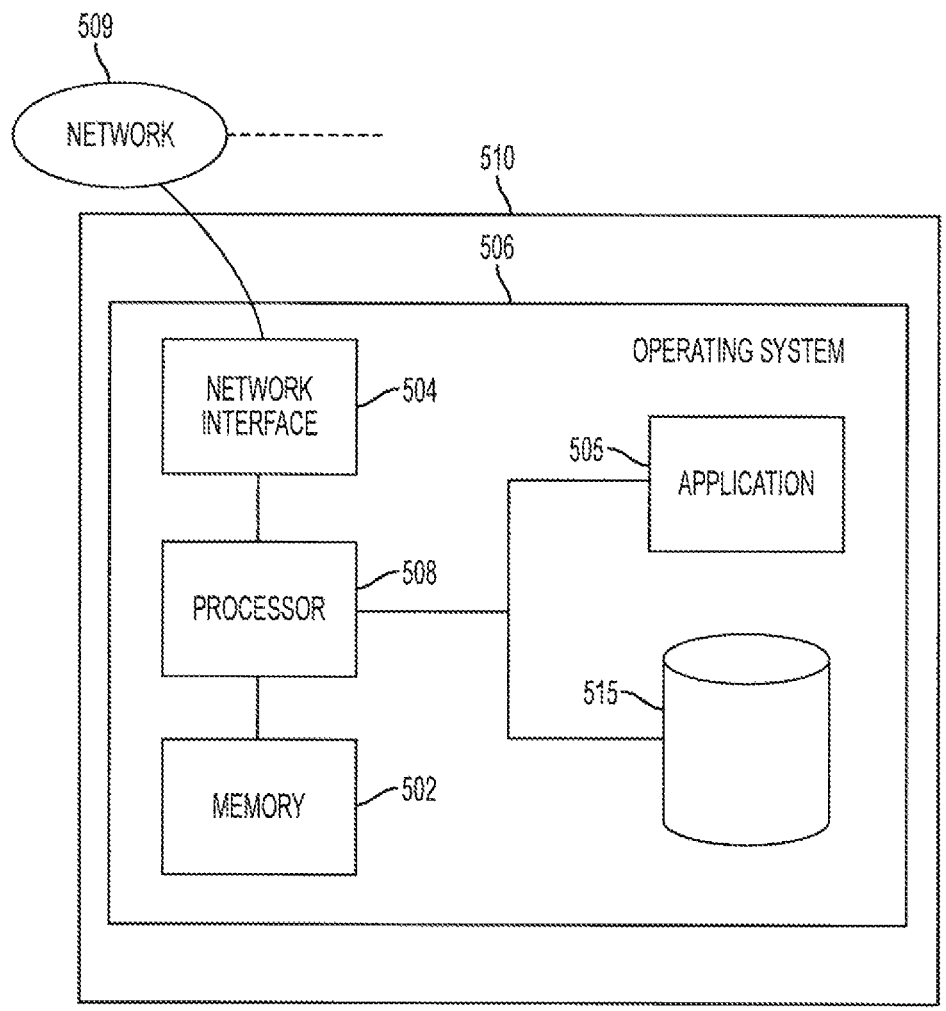
FIG. 5 illustrates a hardware diagram in accordance with another embodiment.

FIG. 5 illustrates an exemplary diagram of hardware and other resources that can be incorporated with processing and logic associated with the present embodiments. As shown in FIG. 5, a server 510 can be configured to communicate with a network 509. In embodiments as shown, the server 510 can comprise a processor 508 communicating with memory 502, such as electronic random access memory, or other forms of transitory or non-transitory computer readable storage mediums, operating under control of or in conjunction with an operating system 506. The operating system 506 can be any commercial, open-source source, or proprietary operating system or platform. The processor 508 can communicate with a database 515, such as a database stored on a local hard drive. While illustrated as a local database in the server 510, the database 515 can be separate from the server 510.

The processor 508 can further communicate with a network interface 504, such as an Ethernet or wireless data connection, which in turn communicates with the network 509, such as the Internet or other public or private networks. The processor 508 can also communicate with the database 515 or any applications 505, such as a graph generation tool or other logic, to execute control logic and perform the email data extraction and graph visualization as described herein.

While FIG. 5 illustrates the server 510 as a standalone system comprising a combination of hardware and software, the server 510 can also be implemented as a software application or program capable of being executed by a conventional computer platform. For example, it should be understood that the components of the server 510 can be implemented on user PCs or other hardware such that the user PCs can communicate directly with the database 515. Likewise, the server 510 can also be implemented as a software module or program module capable of being incorporated in other software applications and programs. In either case, the server 510 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
    identifying, from email data, a set of users associated with the email data;
    generating a communication graph between the set of users, wherein the communication graph comprises a single center node;
    generating an obscured graph by removing the center node from the communication graph;
    determining, by a processor, a set of communities of the obscured graph; and
    generating a community graph by connecting the center node with a center of each of the set of communities,
    wherein the center node is connected to the center of each of the set of communities via a set of links and wherein a set of weights associated with the set of links is generated using an equation $$w(r, c_i) = \frac{1}{|c_i|} \sum_{n \in C_i} w(r, n),$$

wherein r corresponds to the center node and $C_i$ corresponds to the set of communities.

2. The method of claim 1, wherein the center node comprises a single user of the set of users.

3. The method of claim 1, wherein the center node comprises multiple users of the set of users.

4. The method of claim 1, wherein the communication graph further comprises an edge set indicating a set of weights between data of the communication graph.

5. The method of claim 1, wherein the set of communities of the obscured graph is determined by one of a minimum cut algorithm, hierarchical clustering, Girvan-Newman algorithm, or modularity maximization.

6. The method of claim 1, further comprising:
    filtering the communication graph via one or more of a field, a keyword, or a time-span.

7. The method of claim 1, wherein the set of users is identified from a set of metadata fields associated with the email data.

8. The method of claim 1, further comprising:
    generating a visualization of the community graph; and
    providing the visualization of the community graph to an administrator.

9. A system for processing data, comprising:
    an interface to a storage device configured to store email data; and
    a processor, communicating with the storage device via the interface, the processor being configured to:
        identify, from the email data, a set of users associated with the email data;
        generate a communication graph between the set of users, wherein the communication graph comprises a single center node;
        generate an obscured graph by removing the center node from the communication graph;
        determine a set of communities of the obscured graph; and
        generate a community graph by connecting the center node with a center of each of the set of communities,
    wherein the center node is connected to the center of each of the set of communities via a set of links and wherein a set of weights associated with the set of links is generated using an equation $$w(r, c_i) = \frac{1}{|c_i|} \sum_{n \in C_i} w(r, n),$$

wherein r corresponds to the center node and $C_i$ corresponds to the set of communities.

10. The system of claim 9, wherein the center node comprises a single user of the set of users.

11. The system of claim 9, wherein the center node comprises multiple users of the set of users.

12. The system of claim 9, wherein the communication graph further comprises an edge set indicating a set of weights between data of the communication graph.

13. The system of claim 9, wherein the set of communities of the obscured graph is determined by one of a minimum cut algorithm, hierarchical clustering, Girvan-Newman algorithm, or modularity maximization.

14. The system of claim 9, wherein the processor is further configured to:
    filtering the communication graph via one or more of a field, a keyword, or a time-span.

15. The system of claim 9, wherein the set of users is identified from a set of metadata fields associated with the email data.

16. The system of claim 9, wherein the processor is further configured to:
    generating a visualization of the community graph; and
    providing the visualization of the community graph to an administrator.

* * * * *